United States Patent
Kwon et al.

(10) Patent No.: US 8,280,447 B2
(45) Date of Patent: Oct. 2, 2012

(54) MOBILE TERMINAL HAVING REAR KEYPAD

(75) Inventors: Hyuk-Sung Kwon, Suwon-si (KR); Hong-Bae Kim, Yongin-si (KR); Jong-Cheon Wee, Yongin-si (KR); Sang-Hyuck Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 12/343,982

(22) Filed: Dec. 24, 2008

(65) Prior Publication Data

US 2009/0170566 A1    Jul. 2, 2009

(30) Foreign Application Priority Data

Dec. 27, 2007  (KR) .................. 10-2007-0138455

(51) Int. Cl.
*H04B 1/38*  (2006.01)

(52) U.S. Cl. ..................... 455/566; 455/575.1
(58) Field of Classification Search .......... 455/566, 455/556.1, 575.1, 575.3, 575.4, 90
See application file for complete search history.

(56) References Cited

U.S. PATENT DOCUMENTS

| | | | |
|---|---|---|---|
| 7,221,560 B2 * | 5/2007 | Varela | 361/679.08 |
| 7,512,427 B2 * | 3/2009 | Finke-Anlauff et al. | 455/575.1 |
| 7,580,736 B2 * | 8/2009 | Ronkko et al. | 455/575.3 |

* cited by examiner

*Primary Examiner* — Joseph Lauture
(74) *Attorney, Agent, or Firm* — H.C. Park & Associates, PLC

(57) ABSTRACT

A mobile terminal having a rear keypad is provided. The mobile terminal includes: a main body having a front surface and a rear surface opposite to the front surface; a touch screen disposed at the front surface of the main body; and a key input device having a keypad disposed at the rear surface of the main body and extendable outwards to sides of the touch screen.

20 Claims, 12 Drawing Sheets

MOBILE TERMINAL HAVING REAR KEYPAD

CROSS REFERENCE TO RELATED APPLICATION

This application claims priority from and the benefit of Korean Patent Application No. 2007-0138455, filed on Dec. 27, 2007, which is hereby incorporated by reference for all purposes as if fully set forth herein.

BACKGROUND OF THE INVENTION

1. Field of the Invention

The present invention relates to a mobile terminal, and more particularly, to a mobile terminal in which a touch screen is installed in a front surface and a switching type keypad is installed at a rear surface.

2. Discussion of the Background

As information and communication technology and mobile terminal manufacturing technology has developed, various forms of mobile terminals have been introduced that can perform various applications and that can be easily carried. Such mobile terminals are manufactured in various forms such as a bar type, flip type having a cover, folder type, and slide type.

The mobile terminal may have a structure in which a keypad is disposed beneath a screen. Executing various application programs through the mobile terminal may be limited because the screen has a small size. For example, it may be inconvenient to view an image such as digital broadcasting, a movie, and a moving picture, or to view a document through the screen of the mobile terminal.

In order to solve such a problem, a mobile terminal having a touch screen that occupies most of a front surface (hereinafter, referred to as a 'touch type mobile terminal') has also been introduced. Most of the front surface of the touch type mobile terminal may be provided as a screen for displaying an image.

The touch type mobile terminal receives a user's selection signal through a touch of the touch screen, instead of through a physical keypad. The touch type mobile terminal assists a user's key input by displaying a virtual keypad on the touch screen.

However, because the touch type mobile terminal has no physical keypad, the touch type mobile terminal may be inconvenient when executing an application program such as character message writing and a game requiring many key inputs.

Because a keypad of a general mobile terminal or a virtual keypad of the touch type mobile terminal may be limited in size due to an image display area, when the keypad is embodied with a QWERTY key arrangement, it may be difficult for a user to use the keys of the keypad due to a small key size.

SUMMARY OF THE INVENTION

The present invention provides a mobile terminal that can perform both touch input through a touch screen and key input through a keypad.

The present invention also provides a mobile terminal on which a user can use a keypad by extending the keypad to the outside of a main body.

The present invention also provides a mobile terminal having a QWERTY key arrangement that enables easy key input.

Additional features of the invention will be set forth in the description which follows, and in part will be apparent from the description, or may be learned by practice of the invention.

The present invention discloses a mobile terminal that includes: a main body having a front surface and a rear surface; a touch screen disposed at the front surface of the main body; and a key input device having a keypad disposed at the rear surface of the main body and extendable outwards to sides of the touch screen.

The present invention also discloses a mobile terminal that includes: a main body having a front case and a rear case coupled to the front case; a touch screen disposed at a front surface of the front case; and a key input device having a keypad disposed at the rear case and extendable outwards to both sides of the touch screen.

The present invention also discloses a mobile terminal that includes: a main body having a front surface and a rear surface; a display device disposed at the front surface of the main body and occupying a majority of the front surface of the main body; and a key input device having a keypad disposed at the rear surface of the main body and extendable outwards to sides of the display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
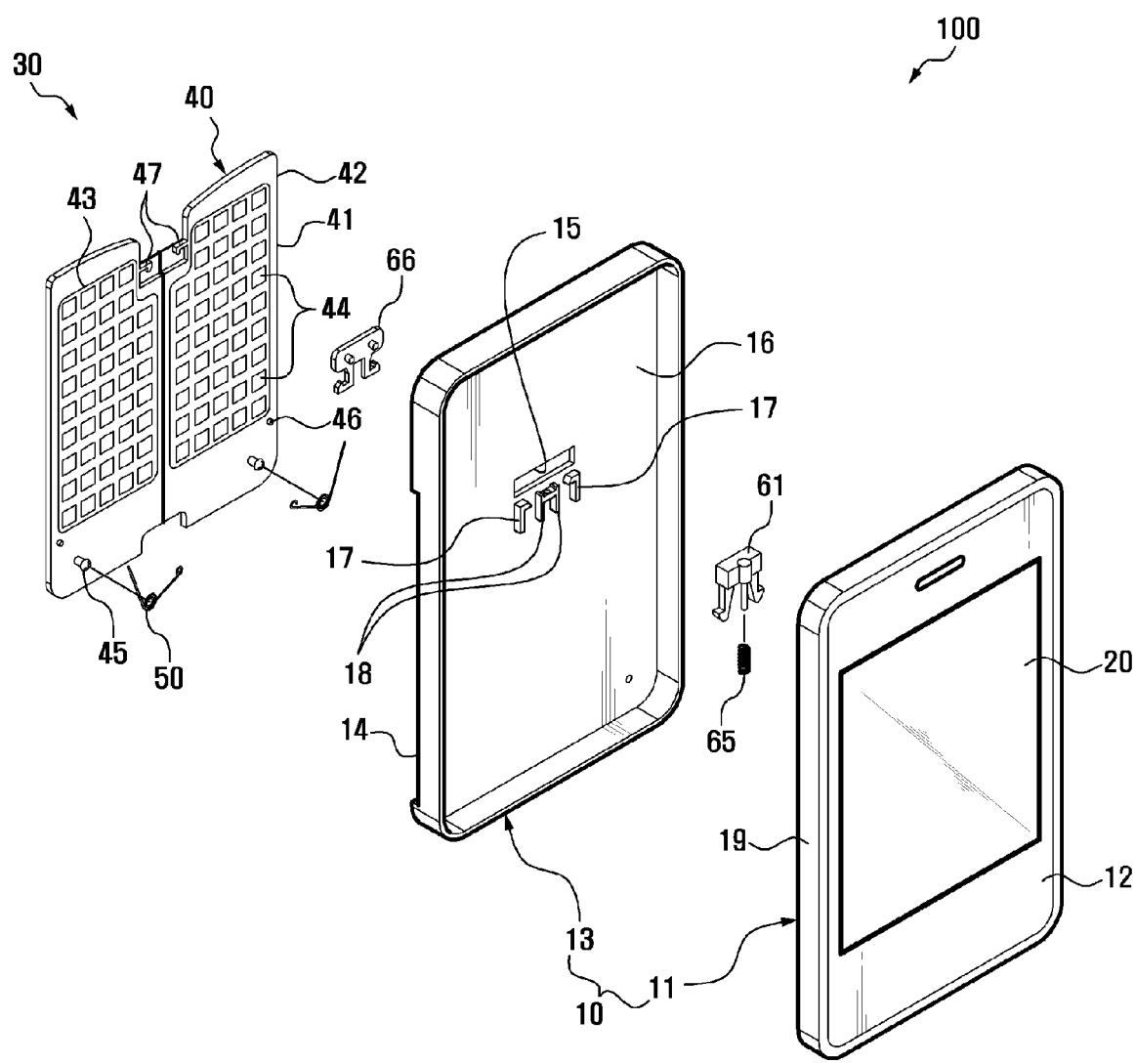
FIG. 1 is an exploded perspective view of a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Referring to FIG. 1, FIG. 2, FIG. 3, and FIG. 4, a touch type mobile terminal 100 according to an exemplary embodiment of the present invention is a bar type mobile terminal and includes a main body 10 and a key input device 30. A touch screen 20 is installed in a front surface 12 of the main body 10. The key input device 30 is disposed at a rear surface 14 of the main body 10, and includes a keypad 40 extendable to both sides of the touch screen 20. The main body 10 includes a front case 11 and a rear case 13 disposed at the front case 11. The touch screen 20 is installed so that a touch panel is exposed in the front surface 12 of the front case 11, and the touch screen 20 occupies most of the front surface 12. The key input device 30 is installed at the rear surface 14 of the rear case 13.

The main body 10 may have a rectangular shape, or a shape similar thereto, and includes the front surface 12, the rear surface 14, and a side surface 19. Although not shown, a main board including a microprocessor for controlling general operations of the mobile terminal 100 is installed within the main body 10, and electrical signals input through the touch screen 20 and the keypad 40 are transmitted to the main board.

Figure 2:
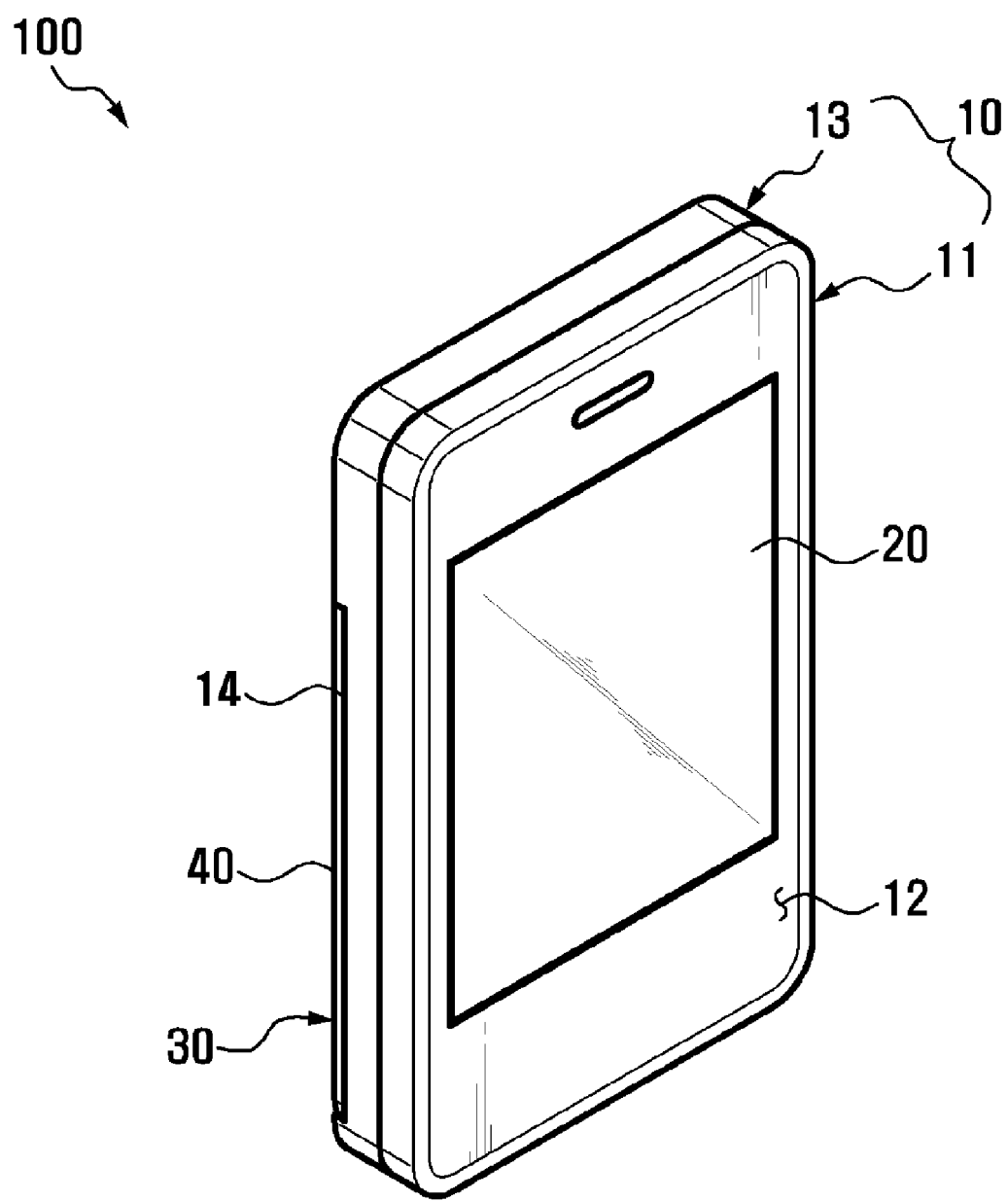
FIG. 2 is a perspective view of the mobile terminal of FIG. 1.

As shown in FIG. 2, the touch screen 20 has a vertical height greater than a horizontal width. The touch screen 20 may support both a horizontal format and a vertical format screen display mode.

The key input device 30 includes a pair of keypads 40, a torsion spring 50, and a locker 60. The pair of keypads 40 is disposed at the rear surface 14 of the rear case 13. The torsion spring 50 is installed at a lower part of the rear surface 14 of the rear case 13 to extend the pair of keypads 40 outwards to both sides of the touch screen 20 using an elastic force. The locker 60 is installed at an upper part of the rear surface 14 of the rear case 13 to fix an upper end of the retracted keypads 40 to the rear surface 14 of the rear case 13, and to release the fixed keypads 40.

The pair of keypads 40 includes a first keypad 41 and a second keypad 43 that are symmetrically and rotatably installed at the rear surface 14 of the rear case 13 such that one side surface of each keypad is in contact with the other keypad in a vertical direction. The retracted first keypad 41 and second keypad 43 each have a vertical height greater than a horizontal width. Thereby, when the first keypad 41 and second keypad 43 are extended outwards by rotating to both sides of the touch screen 20, the first keypad 41 and second keypad 43 each have a horizontal width greater than a vertical height. The first keypad 41 and the second keypad 43 are symmetrically installed and have the same structure; therefore the first keypad 41 is described in detail hereinafter, and a detailed description of the second keypad 43 is omitted.

The first keypad 41 has a structure in which a plurality of keys 44 is arranged in a key plate 42. For example, the keys 44 may be arranged so that the first keypad 41 and the second keypad 43 extended outwards to both sides of the touch screen 20 to form a QWERTY key arrangement. A connection pin 45, fixing protrusion 46, and hooking jaw 47 are formed on the key plate 42. The connection pin 45 protrudes towards the rear case 13 from a corner of a lower part of the key plate 42 adjacent to a vertical edge of the rear case 13, and is coupled to the rear case 13 to rotatably fix the key plate 42 to the rear surface 14 of the rear case 13. The fixing protrusion 46 is formed above the connection pin 45, and one end of the torsion spring 50 is fixed to the fixing protrusion 46. The hooking jaw 47 is formed at an upper end of the side surface of the first keypad 41 that contacts with the second keypad 43 when retracted, and it is fixed by engaging with the locker 60.

In the present exemplary embodiment, the connection pin 45 is integrally formed with the key plate 42, however the connection pin 45 and the key plate 42 may be individually formed. When the connection pin 45 is individually formed, the key plate 42 is rotatably coupled to the rear case 13 by inserting the connection pin 45 into the key plate 42 and the rear case 13.

Figure 8:
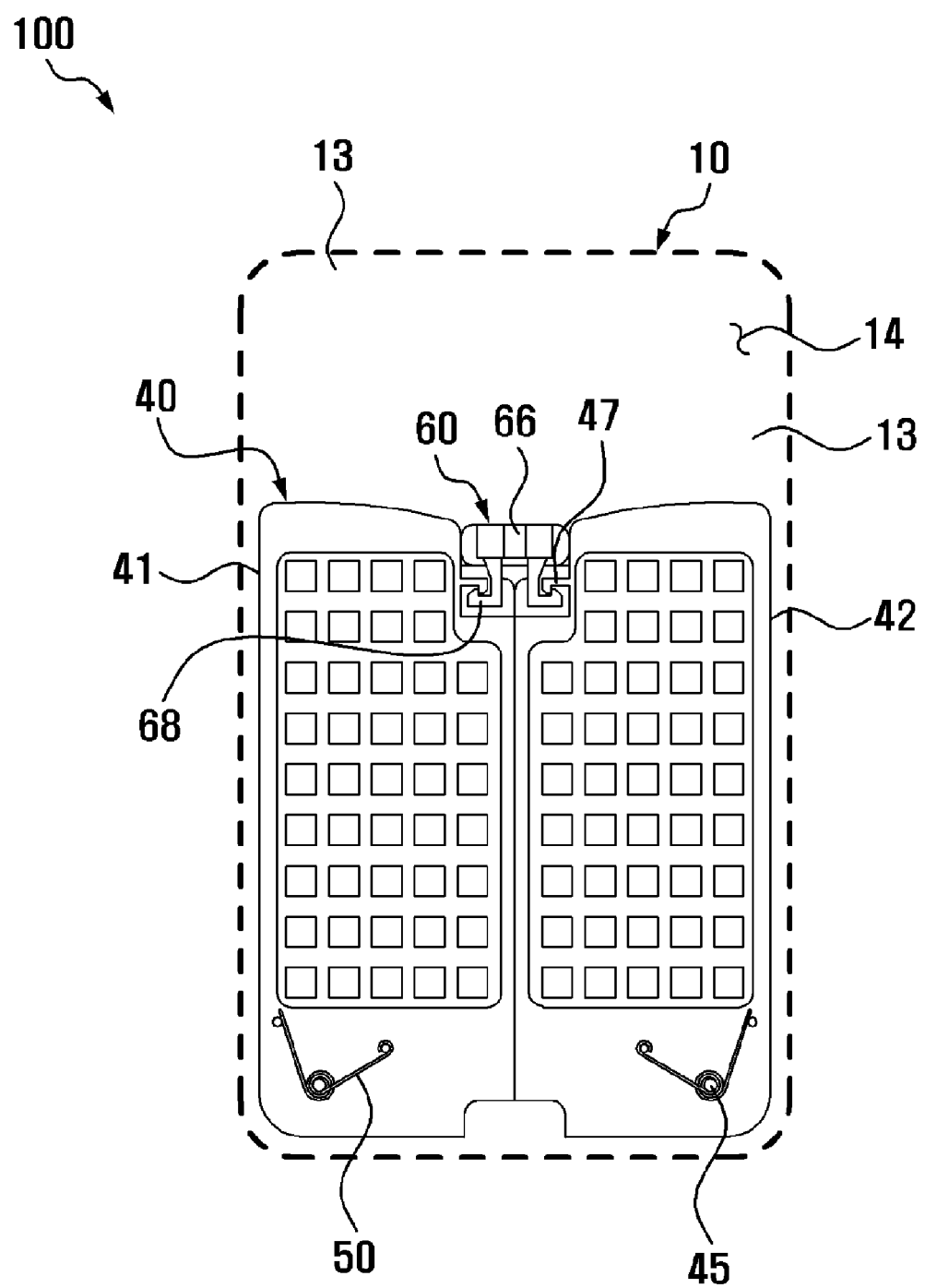
FIG. 8 is a front view showing only the retracted keypad of FIG. 7.
Figure 9:
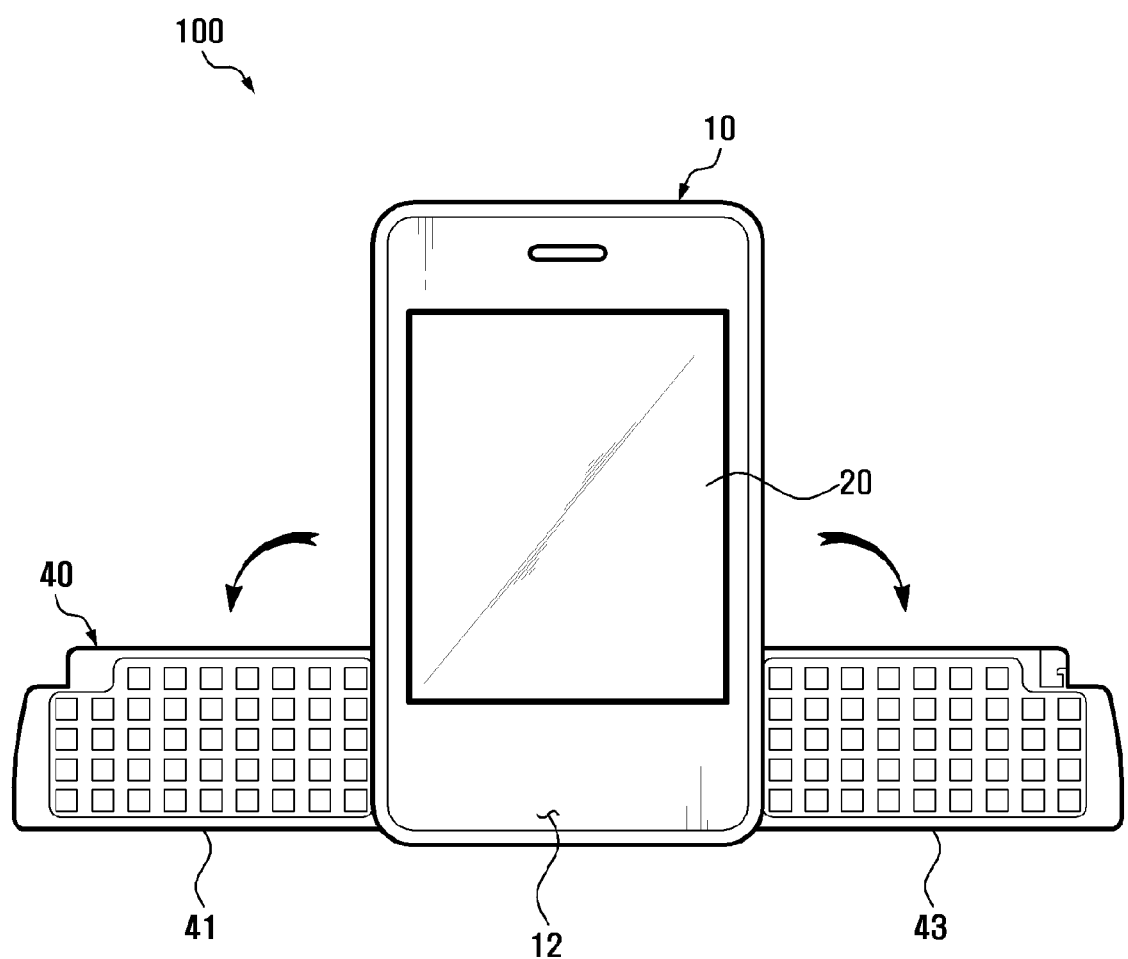
FIG. 9 is a front view of the mobile terminal of FIG. 1 showing the keypad in an extended state.
Figure 10:
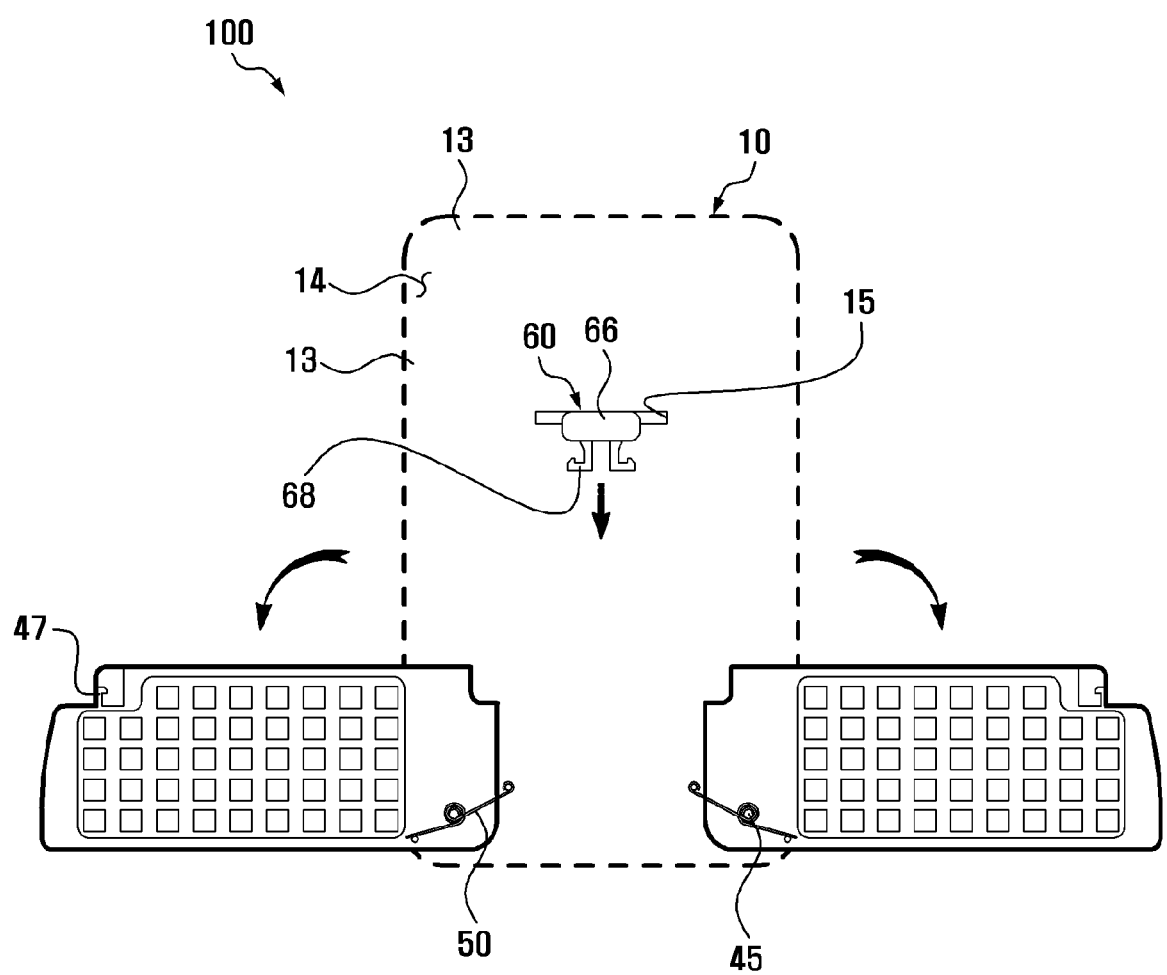
FIG. 10 is a front view showing only the extended keypad of FIG. 9.

FIG. 8 is a front view of the retracted keypads 40. FIG. 9 is a front view of the mobile terminal 100 showing the extend keypads 40. FIG. 10 is a front view of the extended keypads 40.

Referring to FIG. 8, FIG. 9, and FIG. 10, one end of the torsion spring 50 is fixed by being engaged with the fixing protrusion 46 and the other end of the torsion spring 50 is fixed by being engaged with a fixing projection (not shown) formed in the rear surface 14 of the rear case 13. When the keypad 40 is retracted, an elastic force is accumulated in the torsion spring 50, so that when a retracted state of the keypad 40 is released, the keypad 40 extends outwards to both side surfaces 19 of the main body 10 by rotating around the connection pin 45. The connection pin 45 acts as a rotation axis, around which the keypad 40 is rotated by the elastic force accumulated in the torsion spring 50. In the present exemplary embodiment, the connection pin 45 is inserted into the center of a coil of the torsion spring 50.

Figure 3:
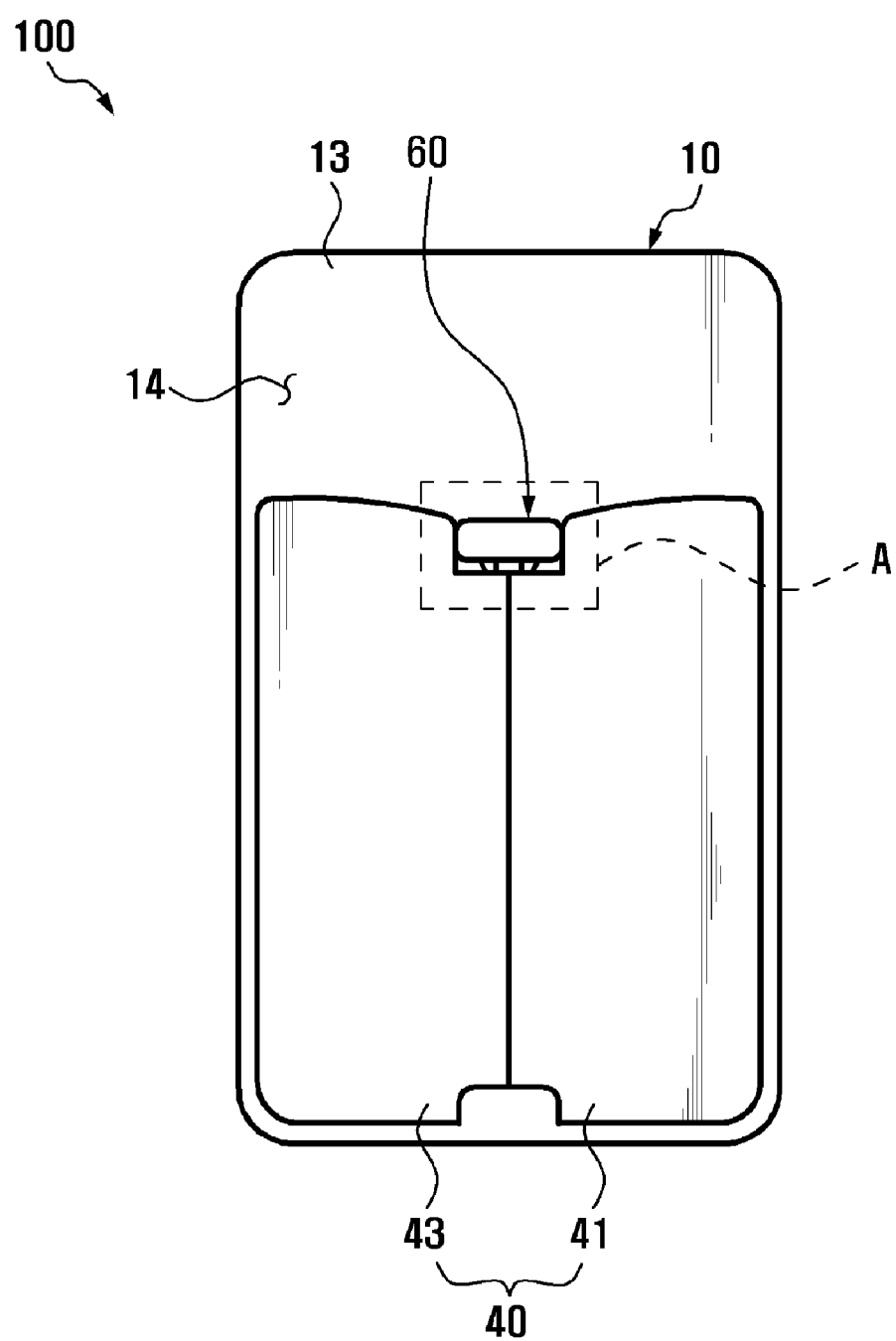
FIG. 3 is a rear view of the mobile terminal of FIG. 1.
Figure 4:
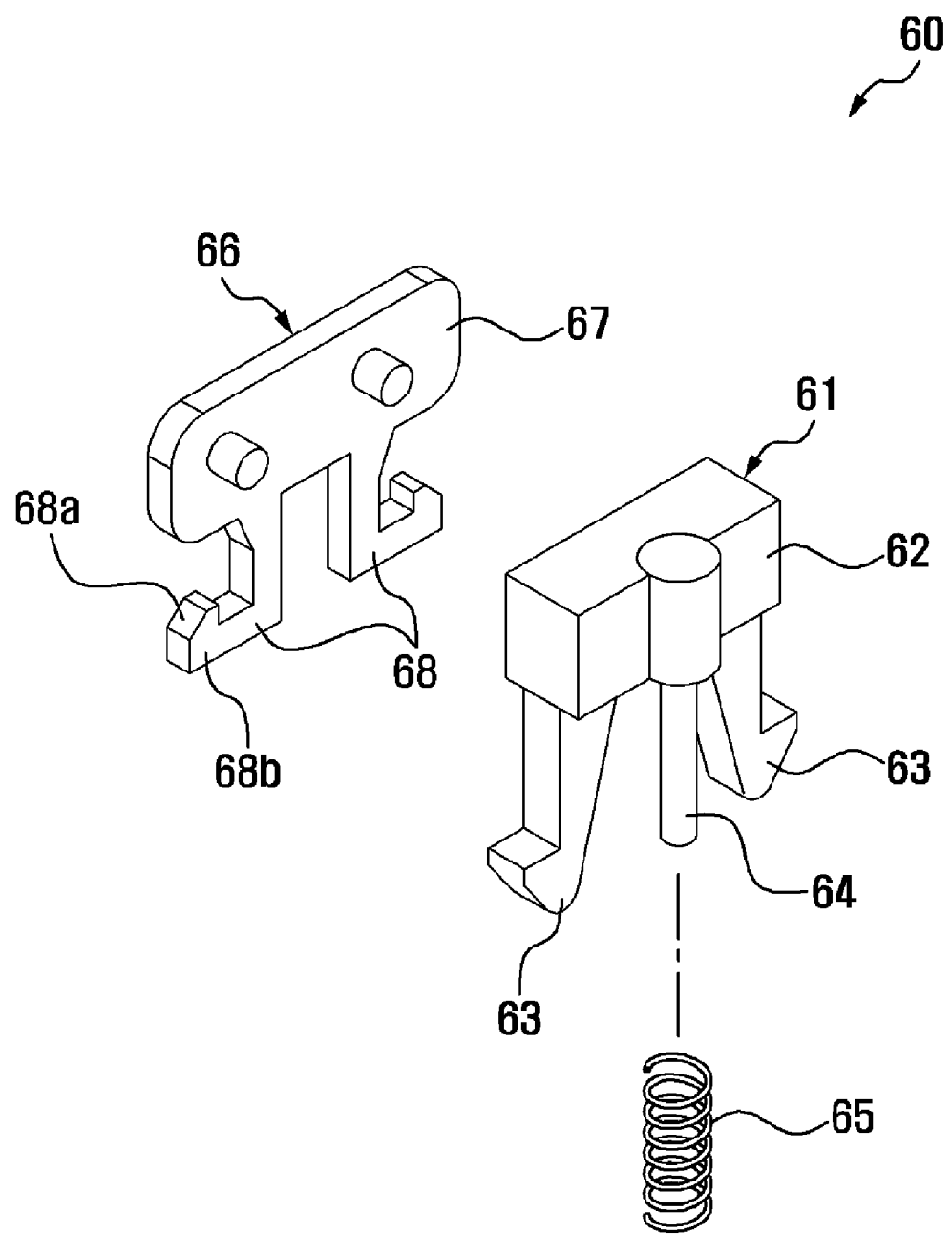
FIG. 4 is an exploded perspective view showing a locker of the mobile terminal of FIG. 1.
Figure 5:
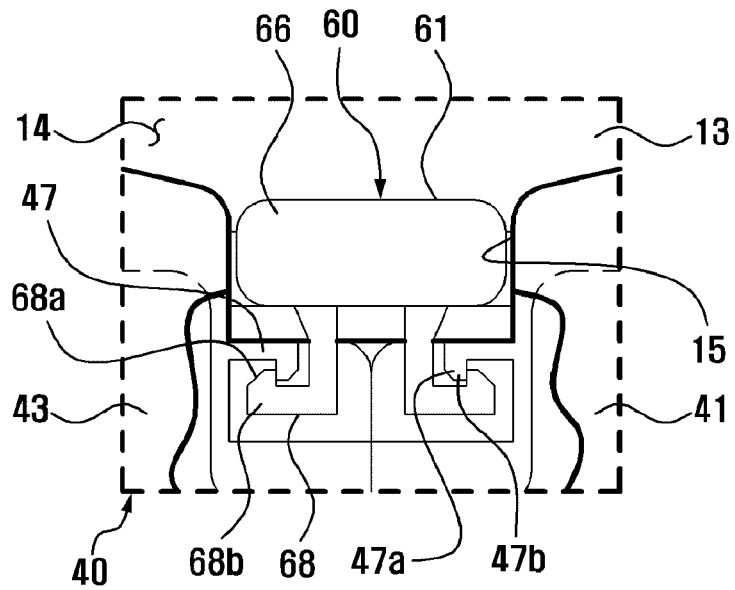
FIG. 5 and FIG. 6 are enlarged views of portion "A" of FIG. 3 showing a keypad fixed to the locker.
Figure 6:
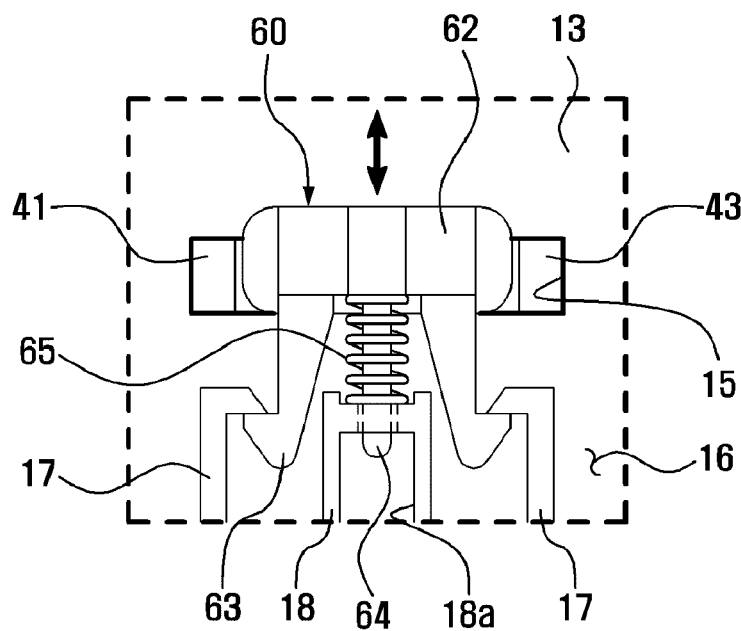

FIG. 4 is an exploded perspective view of the locker 60. FIG. 5 and FIG. 6 are enlarged views of portion "A" of FIG. 3 showing a state where the keypad 40 is engaged with the locker 60.

Referring to FIG. 1, FIG. 4, FIG. 5, and FIG. 6, the locker 60 includes a guide fixing piece 61, coil spring 65, and keypad fixing piece 66. The locker 60 is installed at both sides of a guide hole 15 formed in the rear case 13 to fix the keypad 40, and to release the fixed keypad 40 by an elastic vertical motion within the guide hole 15. The guide fixing piece 61 is installed at a front surface 16 of the rear case 13. The keypad fixing piece 66 is installed at the rear surface 14 of the rear case 13 and is coupled to the guide fixing piece 61 through the guide hole 15. The coil spring 65 permits an elastic vertical motion through the guide hole 15 of the keypad fixing piece 66 and the guide fixing piece 61 connected thereto.

The guide fixing piece 61 includes a first connection plate 62, a pair of first latches 63, and a guide bar 64. The first connection plate 62 is coupled to the keypad fixing piece 66. The pair of first latches 63 are formed at a lower part of the first connection plate 62 and extend downwards. The guide bar 64 is formed at the lower part of the first connection plate 62 between the pair of first latches 63 and extends downwards, and the coil spring 65 is inserted onto the guide bar 64.

A pair of first fixing jaws 17 and second fixing jaws 18 are formed at the front surface 16 of the rear case 13 beneath the guide hole 15 for installing the guide fixing piece 61. The second fixing jaws 18 are formed between the first fixing jaws 17. The pair of first latches 63 engages the first fixing jaws 17 and are elastically connected thereto by the coil spring 65. A lower end of the coil spring 65 is fixed to the second fixing jaws 18. The guide bar 64 moves vertically in a groove 18$a$ between the second fixing jaws 18 by an elastic force of the coil spring 65.

The coil spring 65 is inserted onto the guide bar 64, such that an upper end of the coil spring 65 closely contacts with a lower part of the first connection plate 62, and a lower end of the coil spring 65 closely contacts with an upper part of the second fixing jaws 18 to enable the locker 60 to perform an elastic vertical motion.

Therefore, as the guide bar 64 moves elastically vertically in the groove 18$a$ between the second fixing jaws 18 by an elastic force of the coil spring 65, the locker 60 vertically moves within the guide hole 15. In the present exemplary embodiment, each first latch 63 moves vertically in a space between the first fixing jaw 17 and the second fixing jaw 18 and engages with the first fixing jaw 17 by an elastic force of the coil spring 65 to be restricted from further vertical movement.

The keypad fixing piece 66 includes a second connection plate 67 and a pair of second latches 68. The second connection plate 67 is coupled to the first connection plate 62 of the guide fixing piece 61. The pair of second latches 68 are formed at a lower part of the second connection plate 67 and extend downwards, and the hooking jaws 47 of the retracted keypad 40 are fixed by engaging with the second latches 68 at the rear surface 14 of the rear case 13.

In the present exemplary embodiment, each hooking jaw 47 extends horizontally inwards from the key plate 42 and has a jaw 47$b$ formed at an end part of the horizontal portion and extending downwards, so that the hooking jaw 47 of the keypad 40 may be fixed by engaging with the second latch 68 of the keypad fixing piece 66. The second latch 68 has a portion extending horizontally outwards at a lower part thereof, and a jaw 68$b$ protrudes upwards at an end part of the horizontal portion of the second latch 68. Therefore, as the jaw 47$b$ of the hooking jaw 47 is latched to the jaw 68$b$ of the second latch 68, the retracted keypad 40 is fixed to the locker 60. Further, when the extended keypad 40 is retracted and fixed to the keypad fixing piece 66 of the locker 60, a surface of the jaws 47$b$ and 68$b$ at which the hooking jaw 47 contacts with the second latch 68 are formed as sloped surfaces 47$a$ and 68$a$, respectively. The jaw 47$b$ of the hooking jaw 47 therefore may be latched to the jaw 68$b$ of the second latch 68 after the sloped surface 47$a$ passes along the sloped surface 68$a$ of the jaw 68$b$ of the second latch 68 in a sliding motion.

Therefore, as the extended keypad 40 is retracted to be fixed to the keypad fixing piece 66 of the locker 60, the jaw 47$b$ of the hooking jaw 47 moves upwards as the sloped surface 47$a$ passes along the sloped surface 68$a$ of the jaw 68$b$ of the second latch 68, and the second latch 68 moves downwards, thereby moving the locker 60 downwards. When the sloped surface 47$a$ of the jaw 47$b$ of the hooking jaw 47 has passed fully along the sloped surface 68$a$ of the jaw 68$b$ of the second latch 68, the jaw 47$b$ of the hooking jaw 47 engages with the jaw 68$b$ of the second latch 68 and the locker 60 moves upwards to return to its original position, thus fixing the retracted keypad 40 to the locker 60.

Figure 7:
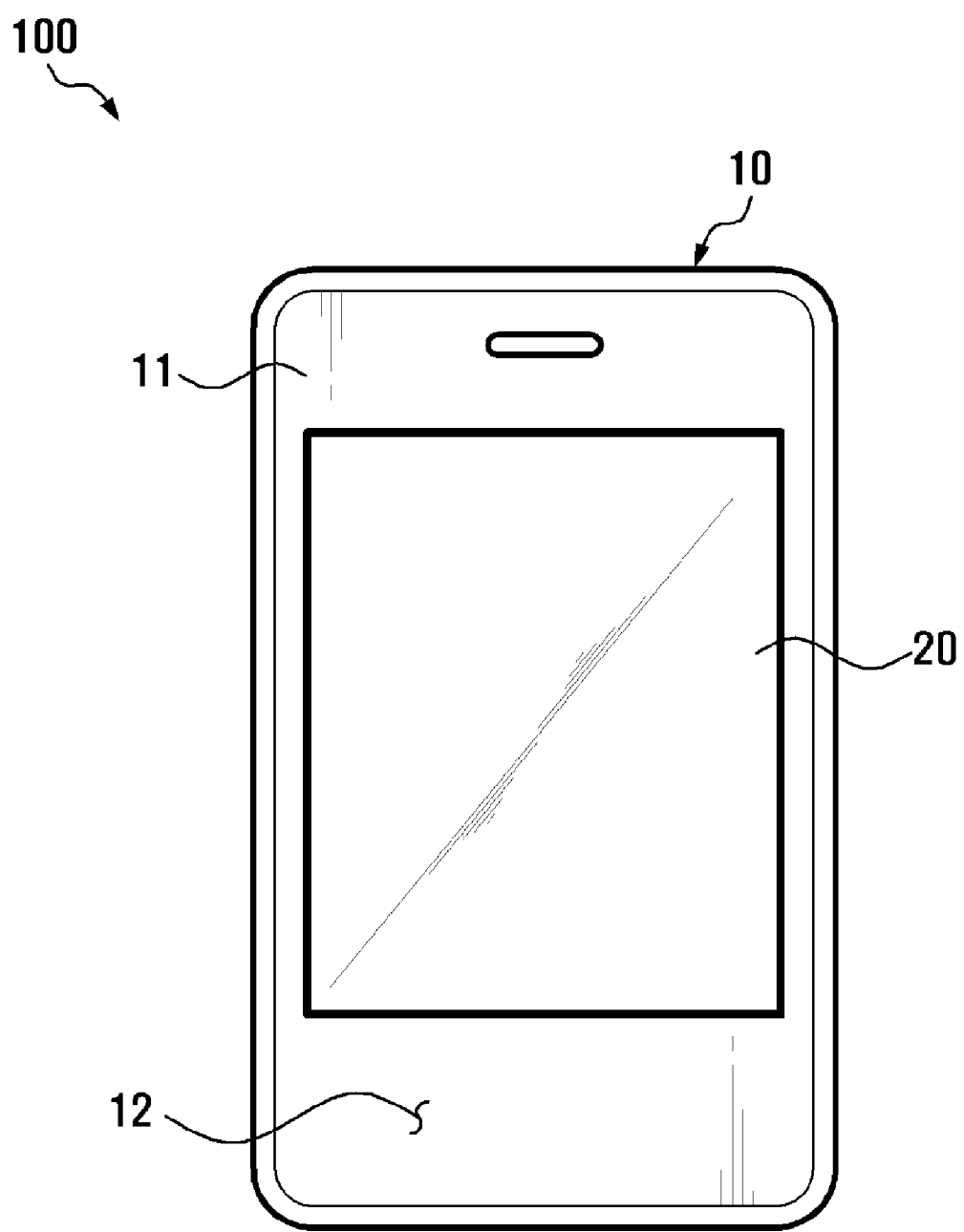
FIG. 7 is a front view of the mobile terminal of FIG. 1 showing the keypad in a retracted state.

Use of the mobile terminal 100 according to an exemplary embodiment of the present invention is described with reference to FIG. 7, FIG. 8, FIG. 9, and FIG. 10. FIG. 7 and FIG. 8 show a retracted state of the keypad 40, and FIG. 9 and FIG. 10 show an extended state of the keypad 40.

Referring to FIG. 7 and FIG. 8, the mobile terminal 100 can be used in a state where the keypad 40 is retracted in the rear surface 14 of the main body 10. In this case, the retracted keypad 40 is fixed to the rear surface 14 of the rear case 13 by the hooking jaw 47 being engaged with the second latch 68 of the locker 60. When a user uses only the touch screen 20 of the mobile terminal 100, the keypad 40 is retracted in the rear surface 14 of the main body 10.

When the user intends to use the keypad 40, the keypad 40 may be extended outwards to both sides of the touch screen 20, as shown in FIG. 9 and FIG. 10. To extend the keypad 40, the keypad fixing piece 66 of the locker 60 is moved downwards, so that the locker 60 is moved downwards within the guide hole 15 and a fixed state of the hooking jaw 47 engaged with the second latch 68 is released. Accordingly, the keypad 40 is extended outwards to both sides of the touch screen 20 by an elastic force of the torsion spring 50. When a downward force applied to the locker 60 is released, the locker 60 returns to an original position by moving upwards within the guide hole 15 by an elastic force of the coil spring 65.

When retracting the keypad 40 extended to both sides of the rear surface 14 of the main body 10, the keypad 40 rotates in a direction opposite to the extending direction, and thus the hooking jaw 47 of the keypad 40 is fixed by engaging with the second latch 68 of the locker 60, as shown in FIG. 5, FIG. 6, and FIG. 7. In this case, the hooking jaw 47 moves upwards in contact with the sloped surface 68$a$ of the jaw 68$b$ of the second latch 68, and thus the locker 60 including the second latch 68 moves downwards within the guide hole 15. When the hooking jaw 47 has passed fully along the sloped surface 68$a$, the locker 60 moves upwards to return to its original position and the second latch 68 engages with the hooking jaw 47, and thus the locker 60 fixes the retracted keypad 40.

In the mobile terminal 100 according to the present exemplary embodiment, the first keypad 41 and the second keypad 42 are extended by rotating 90° to both side surfaces 19 of the main body 10, however the present invention is not limited thereto. For example, the keypad 40 may be used by rotating the first keypad 41 and the second keypad 42 until upper ends of the side surface of the first keypad 41 and the second keypad 42 opposite to the side surface at which the hooking jaw 47 is formed contact with each other. That is, the keypad 40 may be used by rotating each of the first keypad 41 and the second keypad 42 downwards through 180°.

In the present exemplary embodiment, the key input device 30 is installed at the rear surface 14 of the rear case 13, however the present invention is not limited thereto. For example, the key input device 30 may be installed within the rear case 13 to be extended outwards to both side surfaces of the rear case 13 and to be retracted into the rear case 13.

Figure 11:
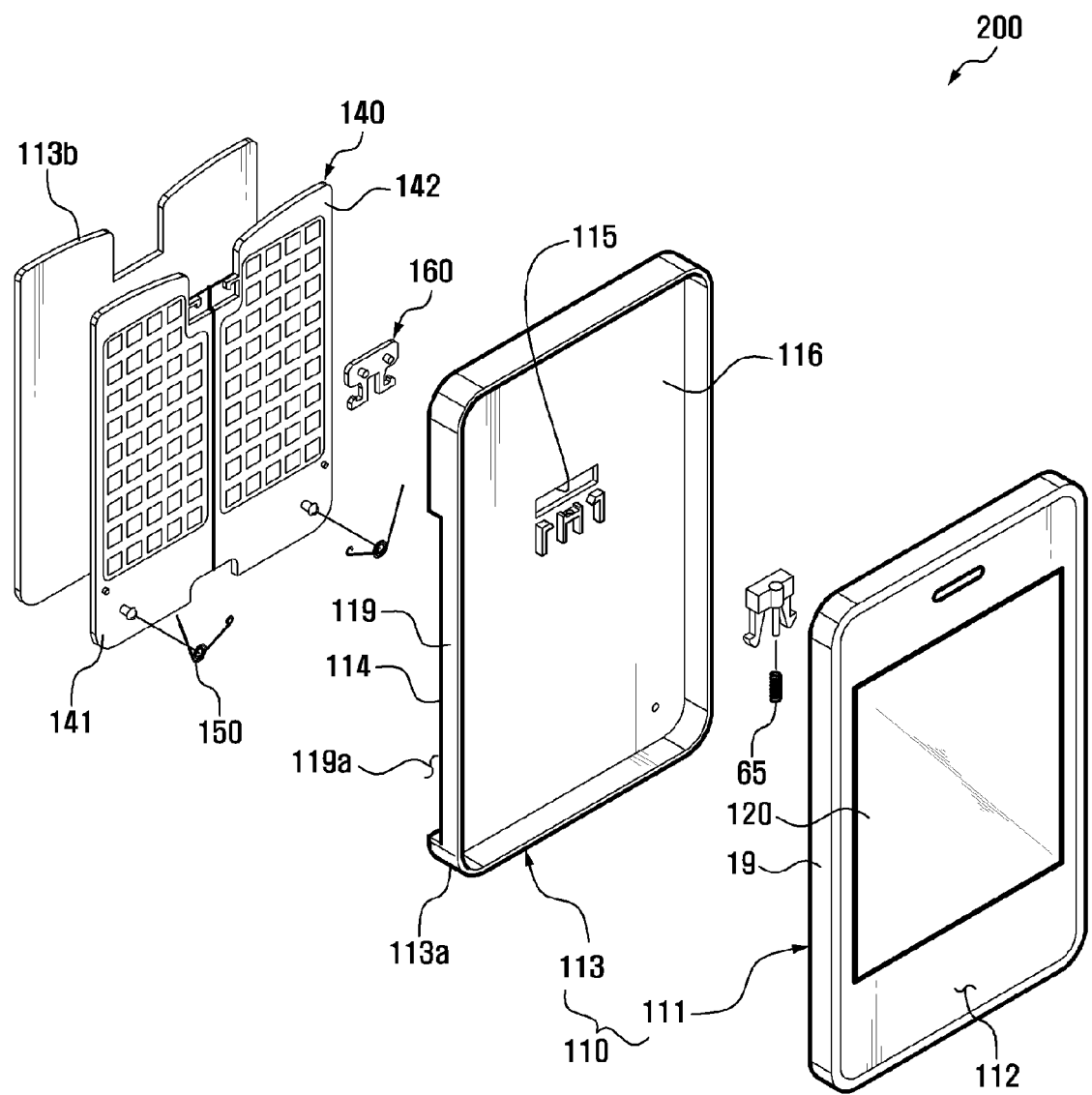
FIG. 11 is an exploded perspective view of a mobile terminal according to another exemplary embodiment of the present invention.
Figure 12:
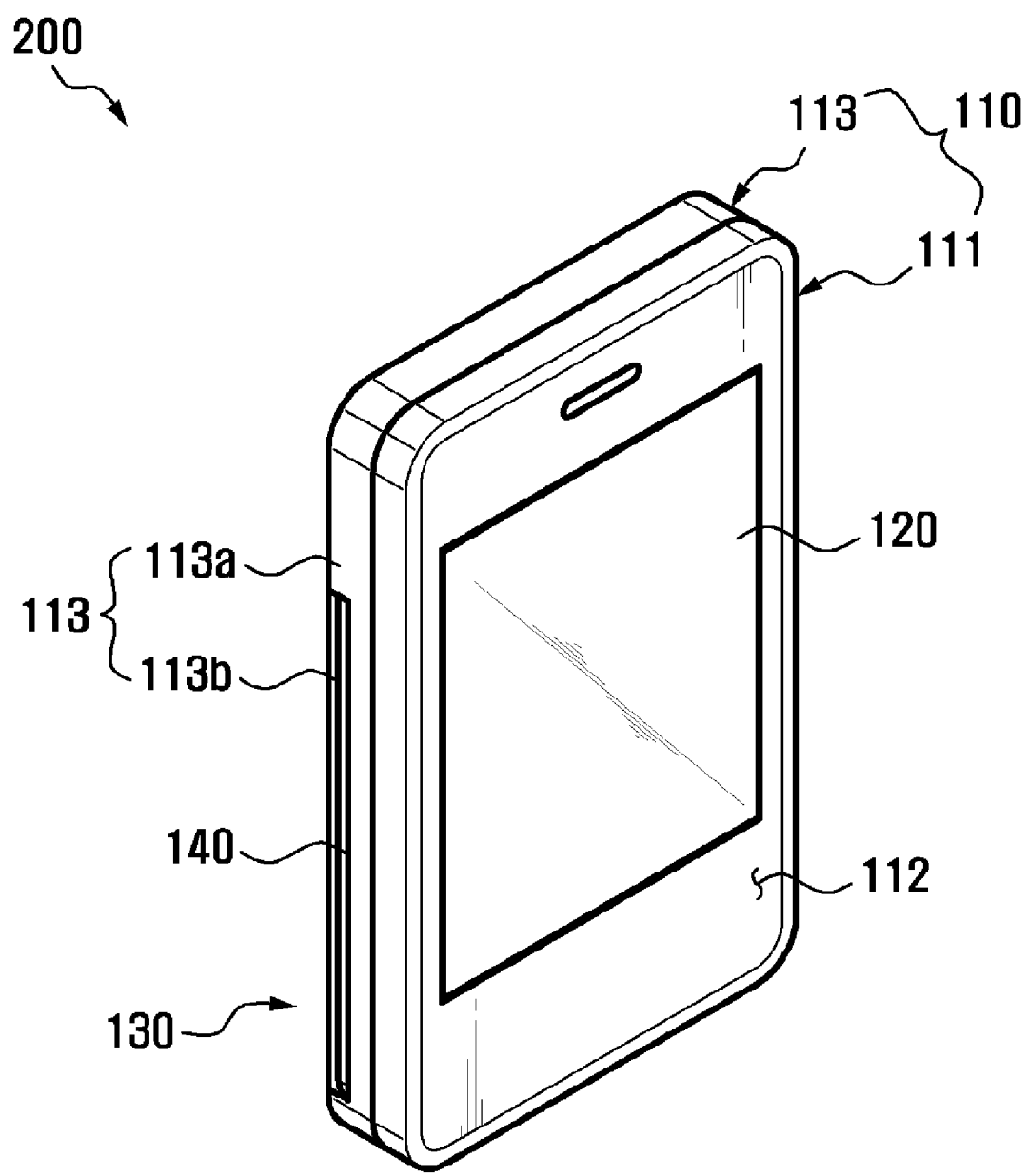
FIG. 12 is a perspective view of the mobile terminal of FIG. 11.
Figure 13:
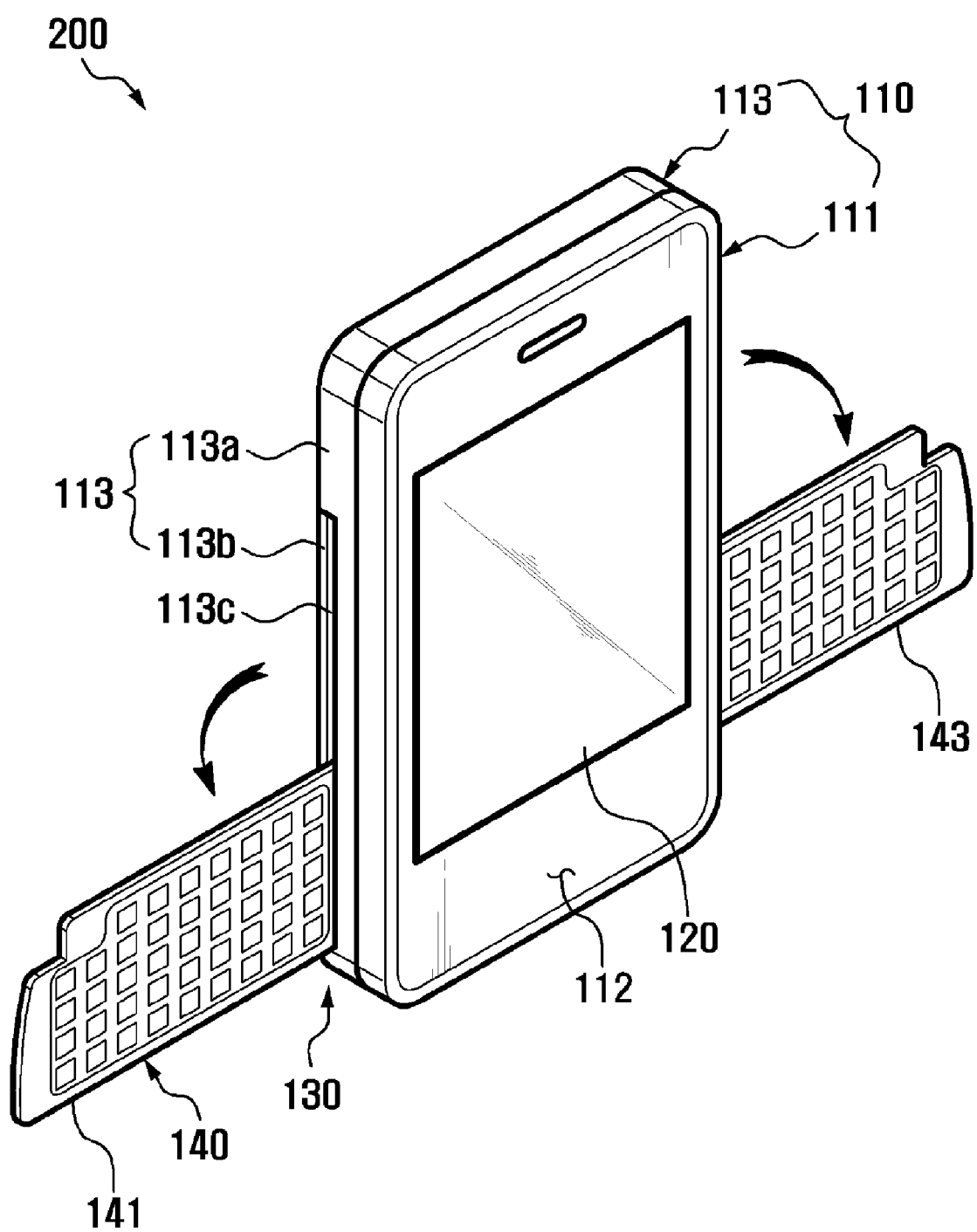
FIG. 13 is a perspective view of the mobile terminal of FIG. 11 showing a keypad in an extended state.

FIG. 11 is an exploded perspective view of a mobile terminal according to another exemplary embodiment of the present invention. FIG. 12 is a perspective view of the mobile terminal of FIG. 11. FIG. 13 is a perspective view of the mobile terminal of FIG. 11 illustrating a keypad in an extended state.

Referring to FIG. 11, FIG. 12, and FIG. 13, a mobile terminal 200 according to another exemplary embodiment is a bar type mobile terminal and includes a main body 110 and a key input device 130. A touch screen 120 is installed in a front surface 112 of the main body 110. The key input device 130 is installed at a rear-facing surface 114 of the main body 110, and includes a keypad 140 extendable to both sides of the touch screen 120. The main body 110 includes a front case 111 and a rear case 113 disposed in the front case 111. The touch screen 120 is installed so that a touch panel is exposed in the front surface 112 of the front case 111, and the touch screen 120 occupies most of the front surface 112. The key input device 130 is installed within the rear case 113.

Particularly, the rear case 113 includes a first rear case 113a and a second rear case 113b. The first rear case 113a is assembled in the front case 111, and the key input device 130 is installed in a rear surface 114 of the first rear case 113a.

The above described structure in which the key input device 130 is installed in the first rear case 113a is the same as that of the mobile terminal 100 according to the previous exemplary embodiment (shown in FIG. 1), in which the key input device 30 is installed at the rear case 13, and thus a detailed description thereof is omitted.

The second rear case 113b is a cover for covering the key input device 30 installed in the rear surface 114 of the first rear case 113a, and the second rear case 113b is installed in the rear surface 114 of the first rear case 113a. An entrance 119a is formed in both side surfaces 119 of the first rear case 113a so that the keypad 140 may extend outwards between the first rear case 113a and the second rear case 113b.

Therefore, the mobile terminal 200 according to the present exemplary embodiment has a structure for extending or retracting the keypad 140 through the entrance 119a formed in both side surfaces 119 of the rear case 113.

In the present exemplary embodiment, the entrance 119a is formed in the first rear case 113a, however the entrance 119a may be formed in the second rear case 113b, or in a combination of the first rear case 113a and the second rear case 113b.

In a mobile terminal according to the present invention, because a touch screen is installed in a front surface thereof and an extendable keypad is installed in the rear surface thereof, the keypad can be extended outwards to both sides of the touch screen and used while using the touch screen of the front surface.

Because the keypad extended outwards to both sides of the front surface of the mobile terminal has a long length in a horizontal direction, the keypad can be easily embodied with a QWERTY key arrangement. Further, because the keypad is arranged at both sides of the touch screen, key input can be easily performed while viewing an image displayed on the touch screen.

If a rear side of the mobile terminal is used for both the keypad and a case, the appearance of the front and rear surfaces of the mobile terminal can be improved. That is, when the keypad is not being used, the keypad can be retracted and hidden within the rear side of the mobile terminal.

Because the mobile terminal according to exemplary embodiments of the present invention provides a wide screen and keypad layout through the touch screen and the keypad extended to both sides of the touch screen, the user can conveniently use various application programs through the mobile terminal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
   a main body having a front surface and a rear surface opposite to the front surface;
   a touch screen disposed at the front surface of the main body;
   a key input device comprising a plurality of keypads disposed at the rear surface of the main body and rotatably extendable outwards to both sides of the touch screen; and
   a locker disposed at an upper part of the rear surface of the main body,
   wherein, in a first position, the locker is configured to fix respective upper ends of the plurality of keypads to the rear surface of the main body, and, in a second position, the locker is configured to release the plurality of keypads to both sides of the touch screen.

2. The mobile terminal of claim 1, wherein the plurality of keypads comprise a pair of keypads and wherein the key input device further comprises:
   a pair of extenders disposed at a lower part of the rear surface of the main body and configured to extend the pair of keypads outwards to both sides of the touch screen.

3. The mobile terminal of claim 2, wherein the pair of extenders comprise:
   a pair of torsion springs having respective first ends fixed to the rear surface of the main body and respective second ends fixed to respective ones of the pair of keypads.

4. The mobile terminal of claim 3, wherein the key input device further comprises:
   a pair of connection pins configured to connect the pair of keypads and the main body and to which the pair of torsion springs is are fitted, wherein the pair of keypads respectively rotate using respective ones of the pair of connection pins as a respective axes of rotation.

5. The mobile terminal of claim 4, further comprising:
   a cover disposed at the rear side of the main body and configured to cover the plurality of keypads when the plurality of keypads are fixed to the rear surface of the main body, the cover having respective entrances through which the plurality of keypads can move.

6. The mobile terminal of claim 2, wherein each keypad of the pair of keypads has a horizontal width greater than a vertical height when extended outwards.

7. The mobile terminal of claim 2, wherein the touch screen has a horizontal width less than a vertical height.

8. The mobile terminal of claim 1, wherein the plurality of keypads extended outwards to both sides of the touch screen have a QWERTY key arrangement.

9. The mobile terminal of claim 1, wherein the touch screen occupies a majority of the main body front surface.

10. The mobile terminal of claim 1, wherein the plurality of keypads have respective horizontal widths less than a vertical height when fixed at the rear surface of the main body.

11. The mobile terminal of claim 1, wherein the plurality of keypads have respective horizontal widths greater than a vertical height when extended outwards to both sides of the touch screen.

12. The mobile terminal of claim 1, wherein the locker comprises:
   a guide fixing piece disposed on a first side of the rear surface of the main body; and
   a keypad fixing piece disposed on a second side of the rear surface of the main body,
   wherein the guide fixing piece is configured to interface with the keypad fixing piece.

13. The mobile terminal of claim 12,
   wherein the main body comprises at least one guide hole, and
   wherein the guide fixing piece interfaces with the keypad fixing piece through the at least one guide hole.

14. The mobile terminal of claim 12, wherein the guide fixing piece comprises:
   at least one latch configured to detachably engage with at least one fixing jaw disposed on the first side of the rear surface of the main body; and at least one biasing member configured to bias the at least one latch towards the at least one fixing jaw.

15. The mobile terminal of claim 12, wherein the keypad fixing piece comprises:
   at least one latch configured to detachably engage with at least one hooking jaw disposed on at least one of the plurality of keypads.

16. The mobile terminal of claim 15,
   wherein the at least one latch and the at least one hooking jaw respectively comprise sloped surfaces configured to slidably interface as the at least one latch detachably engages the at least one hooking jaw, and
   wherein the respectively sloped surfaces do not interface with one another once the at least one latch fully detachably engages with the at least one hooking jaw.

17. A mobile terminal, comprising:
   a main body having a front case and a rear case coupled to the front case;
   a touch screen disposed at a front surface of the front case;
   a key input device comprising a plurality of keypads disposed at the rear case and rotatably extendable outwards to both sides of the touch screen; and
   a locker disposed at an upper part of the rear case of the main body,
   wherein, in a first position, the locker is configured to fix respective upper ends of the plurality of keypads to the rear case of the main body, and, in a second position, the locker is configured to release the plurality of keypads to both sides of the touch screen.

18. The mobile terminal of claim 17, wherein the plurality of keypads comprise a pair of keypads and wherein the key input device further comprises:
   a pair of torsion springs disposed at a lower part of the rear surface of the rear case and configured to extend the pair of keypads outwards to both sides of the touch screen.

19. A mobile terminal, comprising:
   a main body having a front surface and a rear surface opposite to the front surface;
   a display device disposed at the front surface of the main body and occupying a majority of the front surface of the main body;
   a key input device having a plurality of keypads disposed at the rear surface of the main body and rotatably extendable outwards to sides of the display device; and
   a locker disposed at an upper part of the rear surface of the main body,
   wherein, in a first position, the locker is configured to fix respective upper ends of the plurality of keypads to the rear surface of the main body, and, in a second position, the locker is configured to release the plurality of keypads to both sides of the display device.

20. The mobile terminal of claim 19, wherein the plurality of keypads comprise a pair of keypads and wherein the key input device comprises:
   a pair of torsion springs disposed at a lower part of the rear surface of the main body and configured to extend the pair of keypads outwards to both sides of the display device.

* * * * *